UNITED STATES PATENT OFFICE.

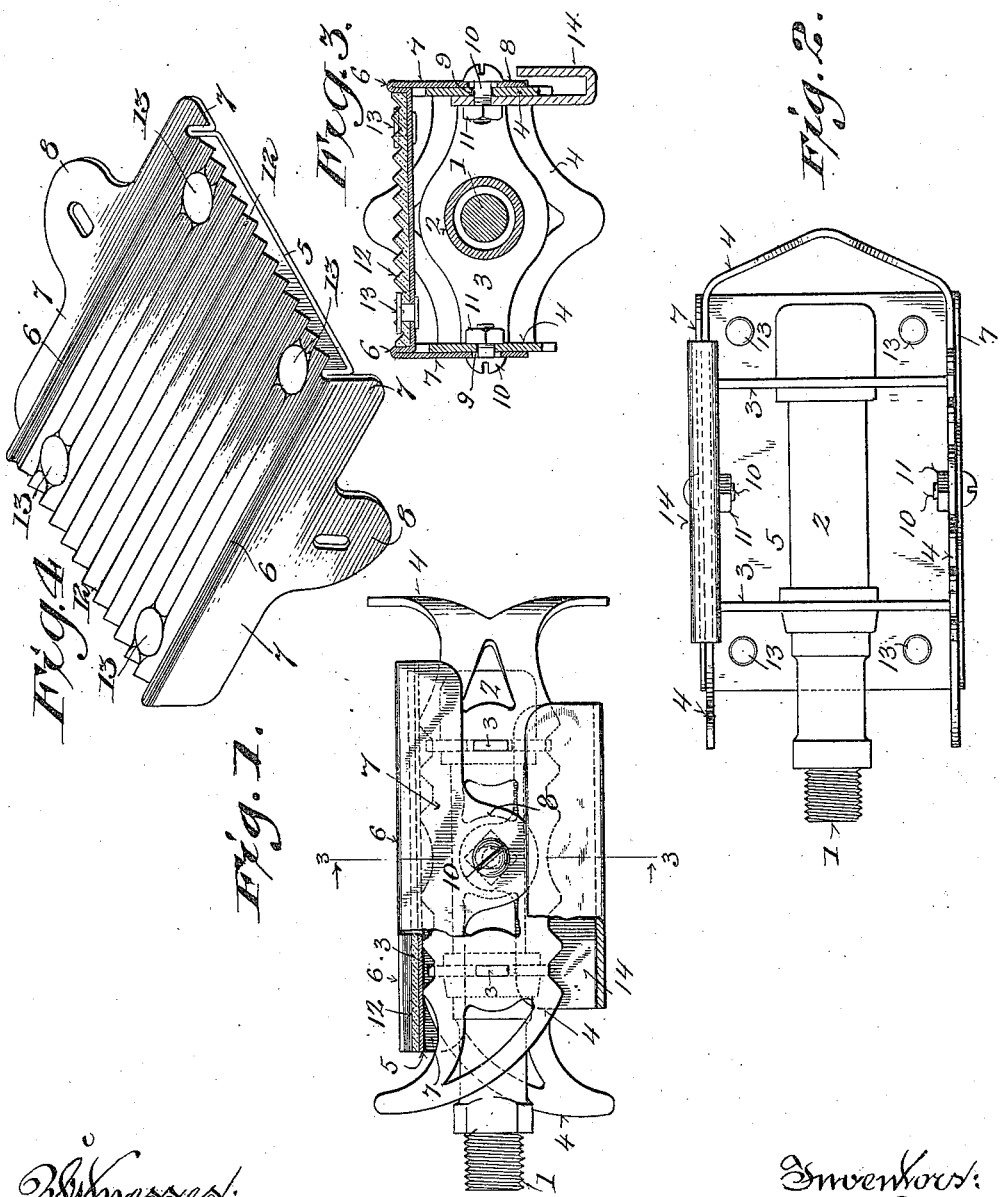

EWALD F. PAWSAT AND HERMANN PAWSAT, OF SHEBOYGAN, WISCONSIN.

GRIP ATTACHMENT FOR PEDALS.

973,065.

Specification of Letters Patent. Patented Oct. 18, 1910.

Application filed September 17, 1909. Serial No. 518,149.

*To all whom it may concern:*

Be it known that we, EWALD F. PAWSAT and HERMANN PAWSAT, citizens of the United States, and residents of Sheboygan, in the county of Sheboygan and State of Wisconsin, have invented certain new and useful Improvements in Grip Attachments for Pedals; and we do hereby declare that the following is a full, clear, and exact description thereof.

The object of our invention is to provide simple, economical and effective grip attachments for bicycle pedals or the like, the invention consisting in certain peculiarities of construction and combination of parts as fully set forth hereinafter with reference to the accompanying drawings and subsequently claimed.

In the drawings Figure 1 represents a side elevation of a bicycle pedal having attached thereto a grip embodying the features of our invention, parts being broken away and parts in section to better illustrate the invention. Fig. 2, a bottom view of the same. Fig. 3, a cross-section, as indicated by line 3, 3 of Fig. 1, and Fig. 4, a perspective view of one of the grips detached.

Referring by numerals to the drawings, 1 indicates a pedal pin upon which is loosely mounted the sleeve portion 2 of a pedal. The sleeve is provided with laterally extending arms 3, which arms support a stirrup-strap 4 of the "rat-trap" type, being provided with upper and lower toothed edges and cut away in scroll formation for the purpose of reduction in weight.

The above described mechanism constitutes a complete pedal of standard construction and forms no part of our invention, which invention primarily consists in providing as an attachment, a corrugated gripping surface in form of an uninterrupted cover for the toothed edges of the stirrup-straps, the gripping surface being preferably composed of a pliable material, such as rubber or composition, reinforced by a metallic backing.

Referring to Figs. 1, 2 and 3 of the drawings 5 indicates a metallic backing-plate that bridges the space intermediate of the edges of the stirrup-strap 4 and rests upon the toothed edges of the same. The width of the tread portion of the backing-plate is approximately the same as the width between the opposite edges of the stirrup-strap, said tread portion being terminated with upturned flanges 6, which flanges are formed by folding the metal upon itself. The outer walls of the flanges are extended to form webs 7, having centrally disposed apertured ears 8, the apertures being so arranged as to coincide with similar apertures 9, which apertures form part of the scroll design of the stirrup-strap. Thus a convenient mode of attaching the grip is had, the apertures 9 being utilized for the reception of retaining bolts 10, which bolts pass through the same together with the apertures in the ears 8 and are thereby clamped to the stirrup-strap by means of nuts 11 in screw threaded engagement with said bolts.

A sheet, 12, of corrugated rubber or other suitable material, is secured to the tread portion of the backing plate 5 by means of rivets 13, the corrugation of the rubber sheet being disposed lengthwise of the pedal with the highest points thereof slightly below the flanges 6, against which flanges said sheet abuts.

In order to hold the pedal in an approximately horizontal position for convenience in adjusting the foot of the operator thereto, in some instances we prefer to secure a pendent weight 14 to one side of said pedal, the weight being suspended from the adjacent bolt 10 upon the inside face of the pedal stirrup as shown in the first 3 figures of the drawings.

From the foregoing described mechanism it will be seen that the sole of an operator's shoe will bear upon the full surface of the corrugated sheet and thus by the adhesive tendency prevent liability of the operator's foot to slip, when propelling a machine equipped with these grips, the device also forming a broad flat surface for the ball of the foot to engage in place of the toothed edges of the stirrup-strap. When pressure is applied to the grip the same will be held against material sagging by contact of the backing-plate, with the arms 3 of the pedal, such slight sag as is permitted by the normal clearance of the arms and backing-plate, being only sufficient to cause the grip to assume a curvature that conforms to the curvature of the sole of a shoe. The flanges 6 as shown are extending above the surface of the corrugated sheet for the purpose of protecting the same from undue wear and also to increase the rigidity of the device at its edges.

Referring to Fig. 4 the grip is shown as having one of the webs 7 extended upon a plane common to the tread-portion of the backing-strap. In some instances this grip is finished in this state for the trade, for convenience in adjusting said grip to pedals of various widths over a common standard, and in such cases the extended web can be bent downward longitudinally, upon a line parallel with the flange and at any point intermediate of said flange and web edge, whereby the width of pedal is accommodated.

We claim:

In a bicycle pedal having a scroll design apertured stirrup strap; the combination of a gripping attachment comprising a continuous backing plate having its body portion supported upon the stirrup strap edges, a pliable corrugated sheet secured to the upper face of the backing plate, closed flanged terminals projecting above the plane of the corrugated face of the sheet and approximately alined with the stirrup strap edges that form supports for said backing plate, the flanges being formed by folding the aforesaid backing plate upon itself, apertured ear extensions depending from the terminal edges of the flanges, and securing bolts arranged to pass through the ear apertures and one of the scroll apertures of said stirrup strap, the projecting flanges of the backing plate being adapted to resist undue strain upon the corrugated sheet.

In testimony that we claim the foregoing we have hereunto set our hands at Sheboygan in the county of Sheboygan and State of Wisconsin in the presence of two witnesses.

EWALD F. PAWSAT.
HERMANN PAWSAT.

Witnesses:
IRENE D. HANSON,
LOUIS GRASSE.